United States Patent
Yu et al.

(10) Patent No.: US 12,155,608 B2
(45) Date of Patent: *Nov. 26, 2024

(54) DYNAMIC TIME DIVISION DUPLEX (DTDD) ACCESS FOR SATELLITE RAN

(71) Applicant: AST & Science, LLC, Miami, FL (US)

(72) Inventors: Zhi Zhong Yu, Reading (GB); Federico Pedro Fawzi, Midland, TX (US)

(73) Assignee: AST & Science, LLC, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,526

(22) Filed: Aug. 16, 2023

(65) Prior Publication Data

US 2023/0403129 A1 Dec. 14, 2023

Related U.S. Application Data

(63) Continuation of application No. 17/867,488, filed on Jul. 18, 2022, now Pat. No. 11,777,700.

(60) Provisional application No. 63/222,633, filed on Jul. 16, 2021.

(51) Int. Cl.
*H04W 56/00* (2009.01)
*H04L 5/14* (2006.01)
*H04W 84/06* (2009.01)

(52) U.S. Cl.
CPC ......... *H04L 5/1469* (2013.01); *H04W 56/005* (2013.01); *H04W 84/06* (2013.01)

(58) Field of Classification Search
None
See application file for complete search history.

(56) References Cited

U.S. PATENT DOCUMENTS

| 9,585,156 | B2 | 2/2017 | Bhattad et al. |
| 11,777,700 | B2 * | 10/2023 | Yu ............... H04B 7/18513 370/329 |
| 2007/0104170 | A1 | 5/2007 | Leung et al. |
| 2007/0184778 | A1 | 8/2007 | Mechaley |

(Continued)

FOREIGN PATENT DOCUMENTS

| JP | 2014042112 A | 3/2014 |
| JP | 2021007230 A | 1/2021 |

(Continued)

OTHER PUBLICATIONS

International Search Report and Written Opinion for PCT/US2022/073859, Dec. 8, 2022, 11 Pages.

(Continued)

*Primary Examiner* — Anh Vu H Ly
(74) *Attorney, Agent, or Firm* — Botos Churchill IP Law LLP

(57) ABSTRACT

A ground station communicates with a satellite having a field of view (FOV), the satellite directly communicating with user equipment (UE) over uplink signals and downlink signals. The ground station has a Dynamic Time Division Duplex (DTDD) controller configured to establish UE uplink time slots during which the UE sends UE uplink signals, the UE uplink time slots based on a unique delay for the UE, whereby UE uplink signals are received at the satellite during a same satellite uplink time slot. The controller avoids overlapping uplink and downlink signals being received at the satellite, as well as at the UE.

21 Claims, 9 Drawing Sheets

(56) References Cited

U.S. PATENT DOCUMENTS

| | | | |
|---|---|---|---|
| 2008/0089270 A1 | 4/2008 | Norris et al. | |
| 2013/0315136 A1 | 11/2013 | Bhaskar et al. | |
| 2017/0290012 A1 | 10/2017 | Hreha et al. | |
| 2018/0084476 A1 | 3/2018 | Kay et al. | |
| 2018/0254825 A1 | 9/2018 | Speidel et al. | |
| 2020/0244345 A1 | 7/2020 | Goettle | |
| 2021/0036768 A1 | 2/2021 | Keshet et al. | |
| 2021/0360587 A1* | 11/2021 | Speidel | H04L 5/0044 |
| 2022/0216896 A1* | 7/2022 | Speidel | H04B 7/043 |
| 2022/0232503 A1* | 7/2022 | Cheng | H04W 56/0045 |
| 2022/0232504 A1* | 7/2022 | Cozzo | H04W 72/1268 |
| 2022/0255619 A1 | 8/2022 | Yu et al. | |
| 2022/0330187 A1* | 10/2022 | Cheng | H04W 56/004 |
| 2022/0330191 A1* | 10/2022 | Shin | G01S 19/256 |
| 2022/0369264 A1* | 11/2022 | Cheng | H04W 56/0055 |
| 2024/0064851 A1* | 2/2024 | Li | H04B 7/18519 |

FOREIGN PATENT DOCUMENTS

| | | | |
|---|---|---|---|
| WO | 2016090411 A1 | 6/2016 | |
| WO | 2021038012 A1 | 3/2021 | |

OTHER PUBLICATIONS

Office Action issued in corresponding Japanese Patent Application No. 2024-502037, mailed Jul. 23, 2024, 8 pages.

* cited by examiner

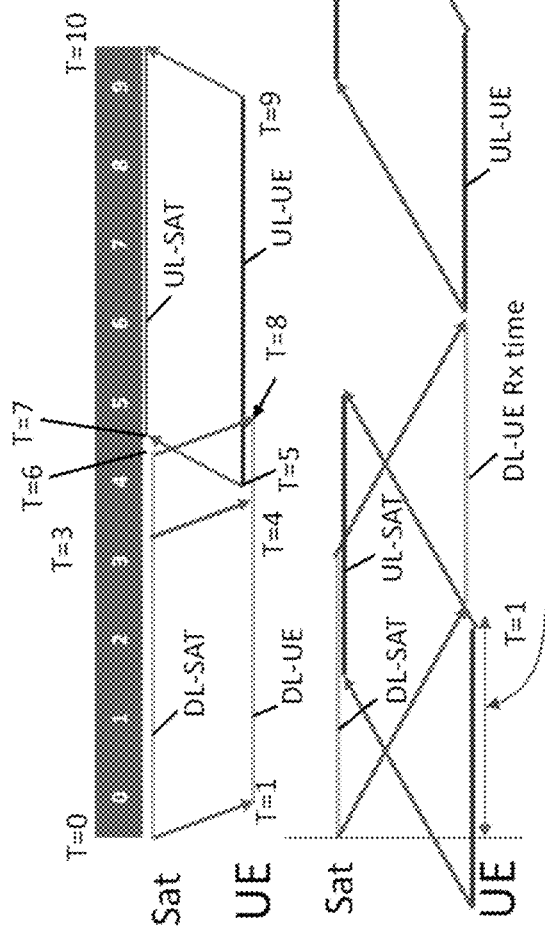
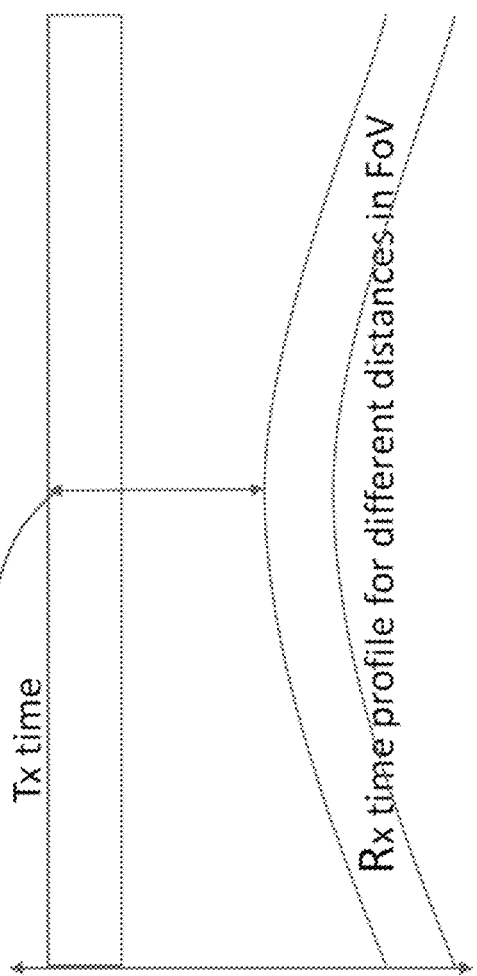
FIG. 4(a)
FIG. 4(b)

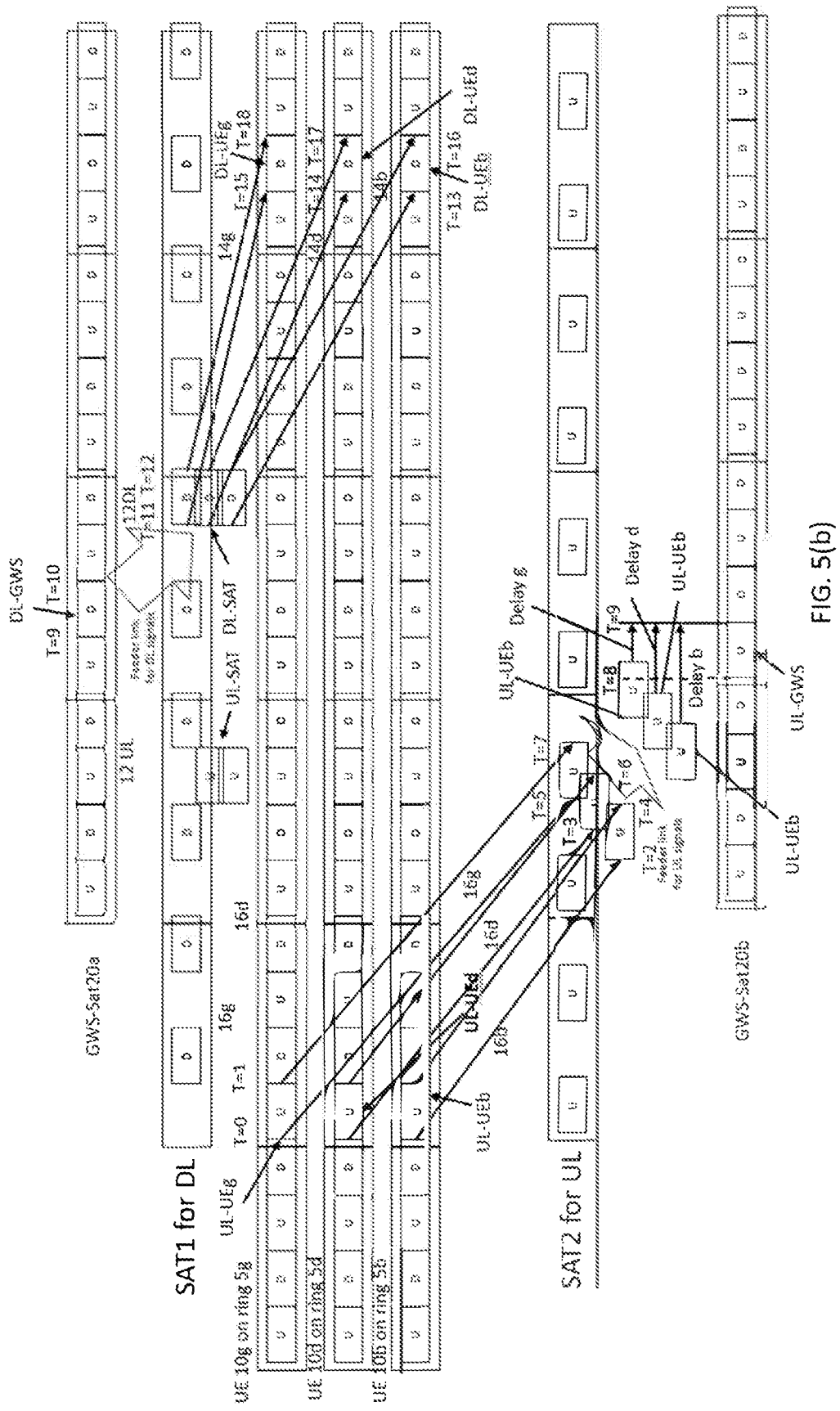

DYNAMIC TIME DIVISION DUPLEX (DTDD) ACCESS FOR SATELLITE RAN

CROSS-REFERENCE TO RELATED APPLICATIONS

This application is a continuation of U.S. patent application Ser. No. 17/867,488, filed Jul. 18, 2022, which claims the benefit of priority of U.S. Provisional Patent Application No. 63/222,633 filed Jul. 16, 2021, the entire contents of which are relied upon and incorporated herein by reference in their entirety.

BACKGROUND

Radio access network (RAN) has two types: FDD (frequency division duplex) and TDD (time division duplex) are two spectrum usage techniques, both forms of duplex, used in mobile or fixed wireless broadband links. It is essential to these links that transmission can occur in both directions simultaneously so that data can flow downlink (DL) and uplink (UL) at the same time. TDD uses a single frequency band for both transmit and receive. TDD alternates the transmission and reception of station data over time. Time slots may be variable in length.

The real advantage of TDD is that it only needs a single channel of frequency spectrum. Furthermore, no spectrum-wasteful guard bands or channel separations are needed. The downside is that successful implementation of TDD needs a very precise timing and synchronization system at both the transmitter and receiver to make sure time slots do not overlap or otherwise interfere with one another.

SUMMARY

A ground station communicates with a satellite having a field of view (FOV), the satellite directly communicating with user equipment (UE) over uplink signals and downlink signals. The base station has a Dynamic Time Division Duplex (DTDD) controller configured to establish UE uplink time slots during which the UE sends UE uplink signals, the UE uplink time slots based on a unique delay for the UE, whereby UE uplink signals are received at the satellite during a same satellite uplink time slot. The controller avoids overlapping uplink and downlink signals being received at the satellite, as well as at the UE.

BRIEF DESCRIPTION OF THE FIGURES

FIGS. 4(a), 4(b) are diagrams showing TDD channel using satellite;

FIG. 5(b) is a timing diagram for a GateWay Station (GWS), two satellites (SAT1, SAT2) and UEs located in rings of FIG. 3.

DETAILED DESCRIPTION

Figure 1:
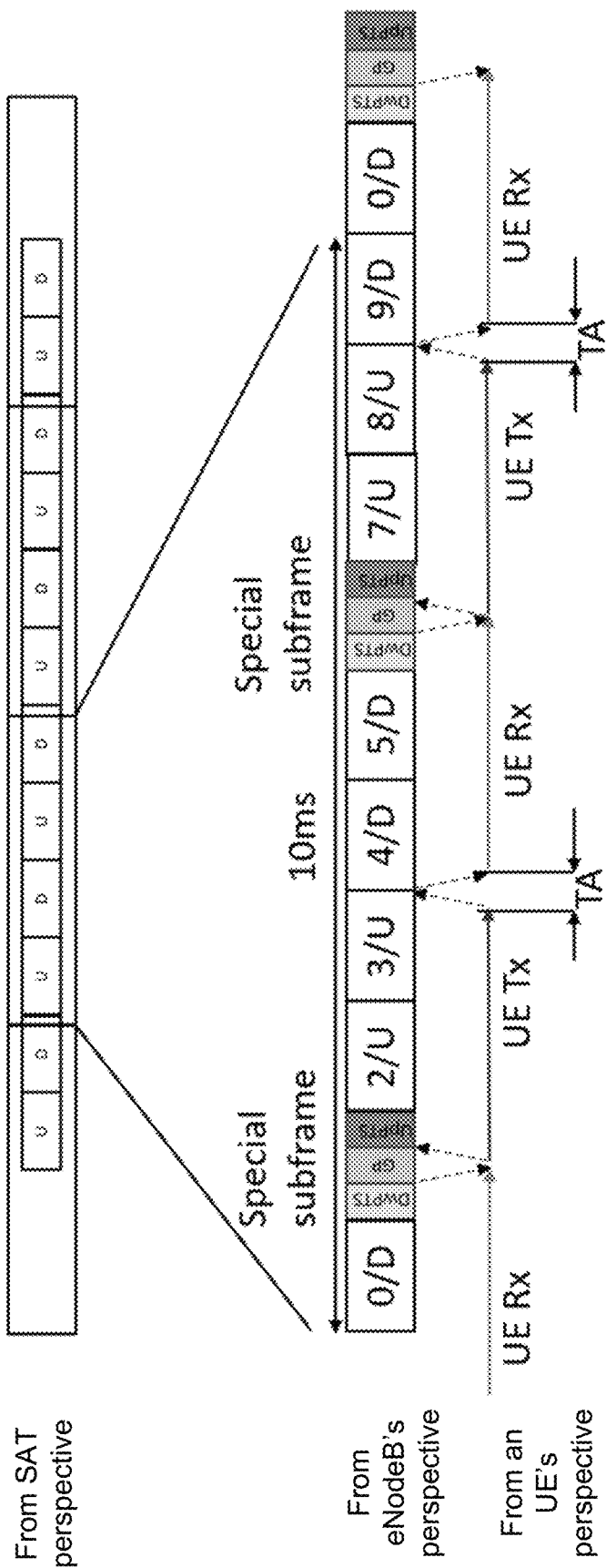
FIG. 1 is a diagram that shows a TDD channel applied to satellite communications.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure. For example, "gNodeB" illustrations and texts are equally applicable to eNodeB.

FIG. 1 shows a standard LTE (Long-Term Evolution) TDD frame of 10 ms. As illustrated, the satellite has predetermined time slots during which an uplink signal is received and predetermined time slots during which a downlink signal is transmitted. In the example embodiment shown, the uplink and downlink time slots alternate with one another. At the ground station processing device, such as an eNodeB, a 10 ms TDD frame has ten subframes 0-9. In the example embodiment shown, the first subframe 0 is when the eNodeB transmit a downlink signal to the UE via the satellite. That is followed by a second subframe, which is a special subframe having a Downlink Pilot Time Slot (DwPTS), a Guard Pilot (GP) and an Uplink Pilot Time Slot (UpPTS). That is followed by two Uplink subframes 2, 3, during which the UE transmits an uplink signal to eNodeB at the ground station, and then two Downlink subframes 4, 5, another special subframes, then another two uplink subframes 7, 8, and then a downlink subframe 9 and the next subframe 0 of the next frame, just like the subframe 0 of this frame at the beginning. Such cycle repeats to deliver continuous DL and UL communications. There can be a few different ratio and granularity of DL and UL slots by RAN system configurations.

As further illustrated in FIG. 1, the User Equipment (UE) on earth communicate with the eNodeB. Here, the UE initially receives a signal from the eNodeB during subframe 0, and receives a control signal during the DwPTS half-subframe, then transmits a signal during the UpPTS half-subframe. The UE then switches to transmit during the subframes 2, 3 for the Uplink signals. The DwPTS and UpPTS provide time to allow downlink/uplink switching to be performed. When the UE switches back to receive during the Downlink signal, it accounts for a Timing Advance (TA) (e.g., 20 μs). The eNodeB instructs the UE to transmit a bit early to meet the time slot at the eNodeB and avoid overlapping signals at the eNodeB. And, there is some offset between the satellite and the eNodeB to allow for switching from downlink to uplink and from uplink to downlink.

TDD is more flexible and efficient in spectrum usage, as the DL and UL traffic is asymmetric and dynamically changing. NR Mid band and High band only have TDD, and FDD stays only for Low band (FR1: below 6 GHz). It can work better than FDD, as the same frequency for Tx and Rx there is no switch insertion loss. The TDD D/U ratio can be dynamically adjusted to suit for the needs, especially for wider bandwidth (BW). The future will have more TDD for UE HW and e/gNB TR/Rx is simpler than FDD, the spectrum usage is more efficient.

Timing is often synched to precise GPS-derived atomic clock standards. Guard times are also needed between time slots to prevent overlap. This time is generally equal to the send-receive turnaround time (transmit-receive switching time) and any transmission delays (latency) over the communications path.

Figure 2A:
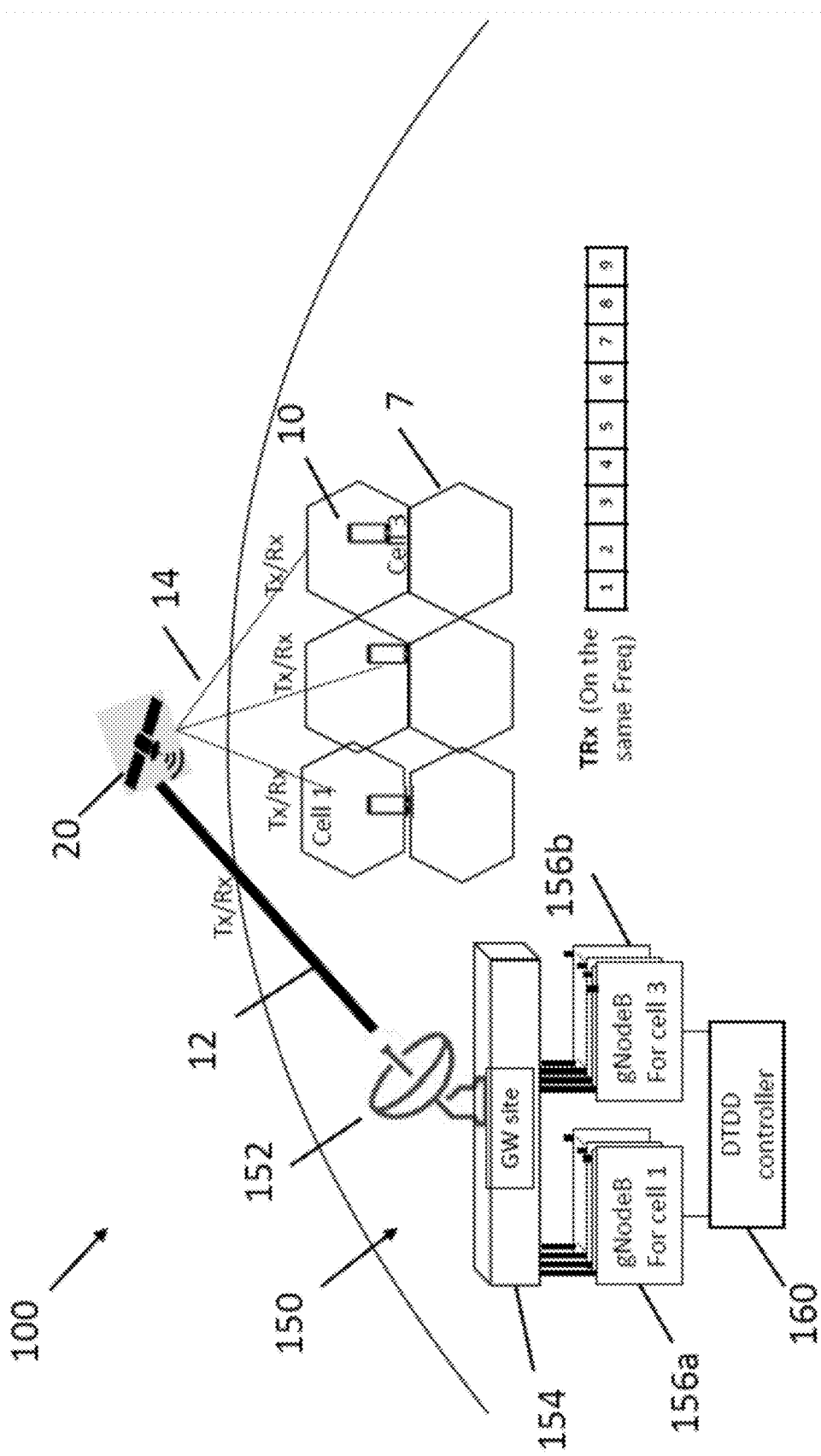
FIG. 2(a) is a diagram showing TDD over satellite and supporting ground infrastructure for a single satellite embodiment.

FIG. 2(a) shows a Dynamic Time Division Duplex (DTDD) access system and method according to the present disclosure. The DTDD system 100 includes a gateway 150 that communicates with one or more Low Earth Orbit (LEO) satellites 20 over Transmit and Receive beams Tx/Rx 12. The satellite 20 directly communicates with one or more User Equipment (UE) 10 located in cells 7 on earth over respective Transmit and Receive beams Tx/Rx 14. The gateway 150 has a gateway antenna 152, a gateway site 154, a first processing device 156a, a second processing device 156b, and a DTDD controller 160. In the embodiment shown, the first processing device 156a includes one or more gNodeBs or eNodeBs, each to control communications over beams 12, 14 with a first cell 7, and the second processing device 156b includes one or more gNodeBs, each to control communications over beams 12, 14 with a second cell 7.

In FIG. 2(a), a single satellite 20 is utilized to communicate with UEs 10 over different frequencies. Time slots are used for transmit signals Tx and receive signals Rx. The DTDD controller 160 separates the transmit signal Tx and receive signal Rx in different frequencies. The DTDD controller 160 dynamically controls operation of the system 100 to coordinate communication between the satellite 20 and the ground station 150 via the antennas 152, and the direct communication between the satellite 20 and the UEs 10. The controller 160 controls the frequency and timing amongst all of the UEs communicating on all of the plurality of gNodeBs 156 to avoid any overlap of communication at the satellite 20. The controller 160 can also receive information on the orbit, Field of View (FOV), etc., and control communications based on that information. The controller 160 handles the frequency and time DL and UL signals with their cell IDs to the plurality of gNodeBs 156, which then provide the synchronization and time slot assignment as normal. That information is then transmitted to and received by the UEs 10 via the satellite 20, to control operation of the UEs to communicate on the designated frequencies and time resource allocations.

Figure 2B:
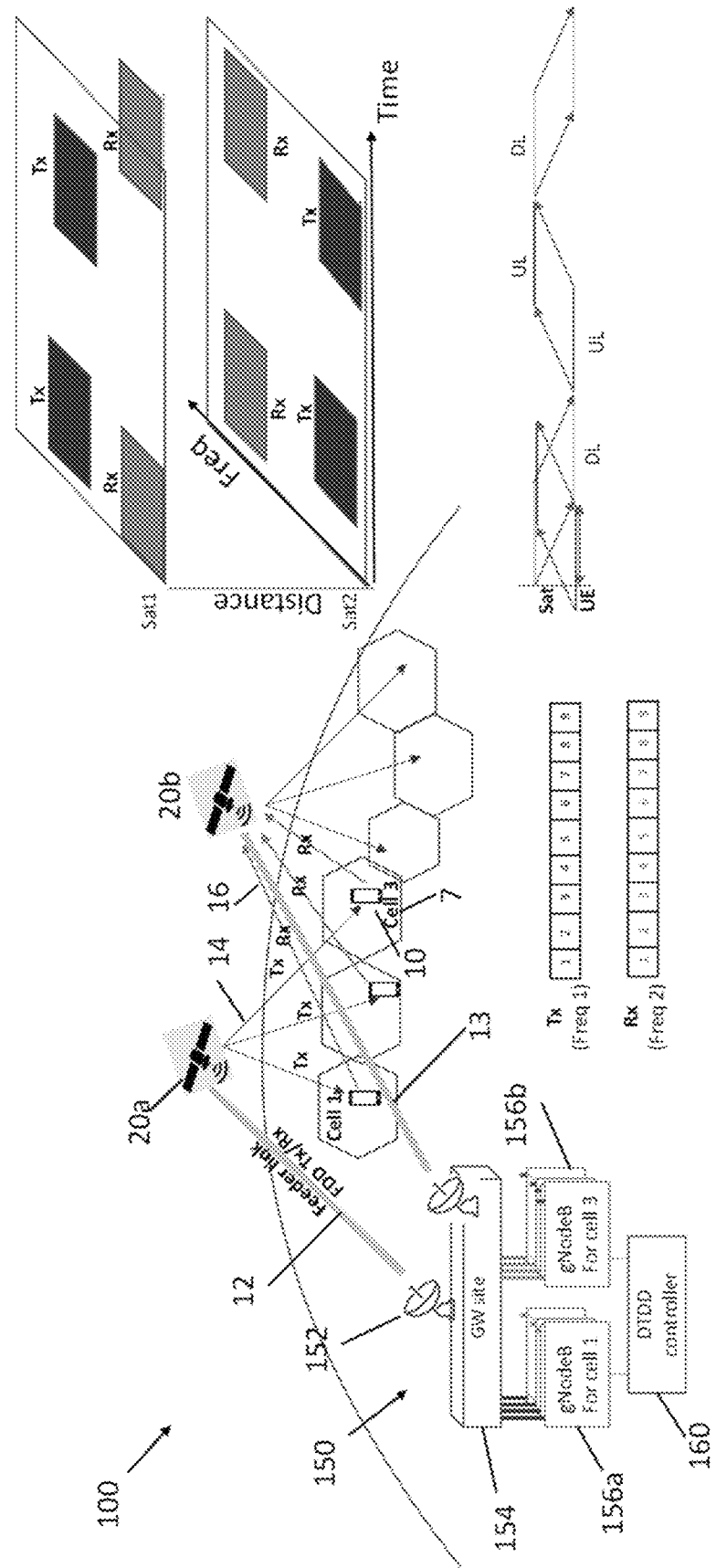
FIG. 2(b) shows TDD over satellite and supporting ground infrastructure for a multiple satellite embodiment.

FIG. 2(b) is an example of another embodiment of the disclosure utilizing multiple satellites, a first satellite 20a and a second satellite 20b. However, additional satellites can be utilized, as a particular cell 7 may be in communication with four or more satellites at any given time. As illustrated, the first satellite 20a communicates a feeder link signal with the GW site 154 over a first beam 12 and the first satellite 20a directly transmits downlink signals to the UEs on earth over a second beam 14. And the second satellite 20b communicates a signal with the GW site 154 over a third beam 13 and directly receives uplink signals from the UE on earth over a fourth beam 16. And, as further shown, the second satellite 20b can transmit a downlink signal to different cells than the downlink signal 14 from the first satellite 20a.

As the satellites orbit, the setting satellite 20a can conduct handover to transfer the uplink signal, then the downlink signal, for the cells to the setting satellite 20b; thus, when the second satellite 20b takes over the uplink signal, then 20a can release. However, in the embodiment shown, one satellite (the first satellite 20a) communicates the downlink signal and a different satellite (the second satellite 20b) communicates the uplink signal; though in other embodiments a single satellite can conduct both uplink and downlink (FIG. 2(a)). In some embodiments, the transmit signal Tx is over a first frequency, and the receive signal Rx is over a second frequency different than the first frequency for different regions/cells, while the Tx and Rx of the same frequency from the same cell are handled separately by two satellites so that with multiple satellites, TDD TRx collision can be avoided completely, and the GWS 154 can route the TRx signal to two satellites over different feeder links and combine the relevant DL and UL signal for the BBUs, and the UEs can communicate uplink signals and downlink signals as they do normally without causing timing collision issue on the same satellite, as two satellites are handling Tx and Rx at different position in the space. They have their own Tx and Rx beams for the same cell. It is the ground gateway site managing the feeder links and take the spatial diversity to resolve such challenges.

Accordingly, at any given time, the DTDD 160 dynamically controls the operation of the system 100 in real time to coordinate communications between the first and second satellites 20a, 20b with the ground station 150 over the antennas 152, and between the first and second satellites 20a, 20b directly with the UEs 7. The controller 160 can also receive information on the orbit, Field of View (FOV), etc., and control communications based on that information. The UEs 7 directly transmit signals to the second satellite 20b at a certain time subchannel and receive signals from the first satellite 20a at a certain time channel, so that there is no interference or overlap of communications at the satellites 20a, 20b, and the satellites 20a, are fully utilized.

Referring to the time vs. distance chart of FIG. 2(b), the FOV are generally large enough to find cells using LB or HB, so two satellites can be arranged for taking care of two different bands, for example, 20a Tx LB cells, but Rx the HB cells; while 20b Tx HB cells, but Rx the LB cells. In this way they can avoid TDD collision effectively.

Figure 2C:
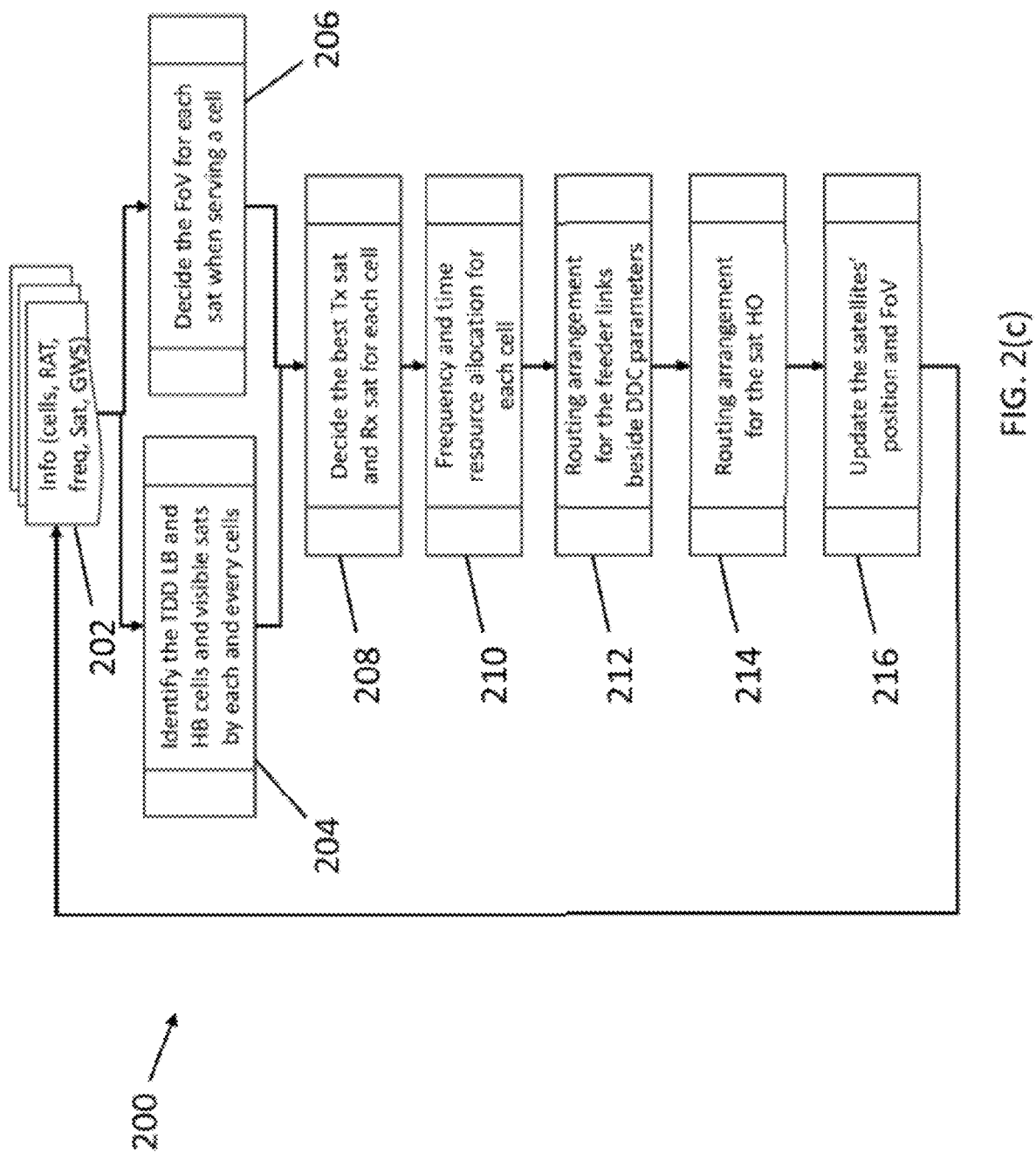
FIG. 2(c) is a flow diagram.

FIG. 2(c) shows the operation 200 of the DTDD 160 in accordance with one example embodiment of the present disclosure. Starting at step 202, the satellite control center provides information about the system, including for example the cells, RAT, frequencies, satellite(s) and gate way site. At step 204, the satellite control center also provides the TDD low band (Tx) cells and high band (Rx) cells and visible satellites 20 by each and every cell 7. And, step 206, the satellite control center also provides the field of view for each satellite 20 when serving a cell 7. The information from steps 202, 204, 206 can be accessed by or communicated to any of the DTDD 160 or the gNodeB.

At step 208, the DTDD 160 determines, for the information obtained from the NCC and the satellite control center, the best satellite transmit signal Tx and satellite receive signal Rx for each cell. At step 210, the DTDD 160 allocates a frequency and time resource for each cell, step 210. The controller 160 also determines (with respect to two satellites), step 212, the routing arrangement of the feeder links, as well as the direct digital control (DDC) parameters and, step 214, the routing arrangement (mapping) for satellite hand over. It then updates the satellite's position and field of view at the satellite control center, step 216. That information is then transmitted to the UEs via the gNodeBs and satellite(s). The gNodeB operates in accordance with its standard compliant procedures, and here configures the signal to a baseband signal for communication with the satellite(s). Thus, the DTDD controller 160 determines the frequency and time resource allocation for each cell, step 210, and utilizes that information to configure operation of the UL and DL signals at the satellite(s), UEs, and gate way station 154.

The entire operation at the DTDD 160 (as well as the satellite control center) is conducted automatically and without any manual interaction. Accordingly, unless indicated otherwise the process can occur substantially in real-time without any delay or manual action.

Figure 3:
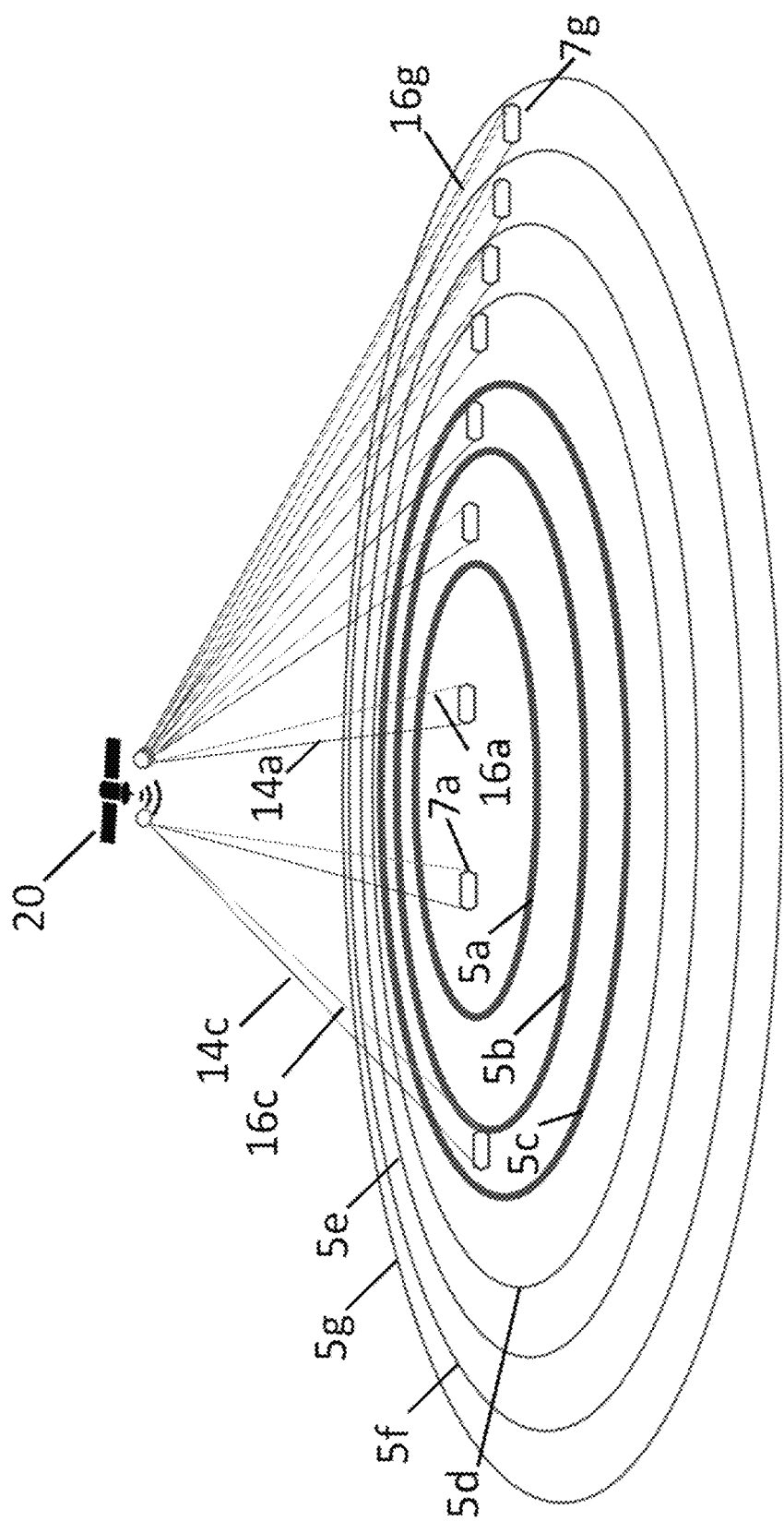
FIG. 3 is a diagram showing TDD Tx/Rx rings.

FIG. 3 is a diagram showing a FOV for a single satellite 20. The gNodeBs 156 each separate the FOV into a plurality of concentric TDD Tx/Rx rings 5 based on a distance (pathlength) from the satellite 20 to the ground. The shortest pathlength is at the center of the FOV at the first ring 5a, which is located directly below the satellite 20. Each subsequent surrounding ring 5b-5g extends further outward from the first ring 5a and is associated with a further distance from the satellite 20. The satellite 20 directly communicates with the UEs 7 positioned in each of the rings 5a-5g via a respective transmit beam 14a-14g and a respective receive beam 16a-16g.

The outermost ring 7g is furthest from the satellite 20 and defines the outer perimeter of the FOV for the satellite 20. The beams 14g, 16g communicating with the outermost ring 7g typically form an angle of about 20 degrees (though larger or smaller angles can be utilized) from the UEs 7 on the ground to the satellite 20. The FOV and rings 5 follow the satellite 20 as it orbits earth. One or more cells 7a-7g are located in a respective ring. For synchronization, area is in rings so the latency to the satellite 20 is similar for all the UEs in each ring, and all the cells 7 in the FOV have the same ratio for DL/UL.

The beams 14, 16 track the cells and hence the cell tracking beams change their rings every few seconds, which means the gNBs 156 shift the special time slot from one subframe to the next, so that all the FOV would roughly align the TRx switching time on the same subframe. Such dynamic changes are actually changing slowly and UEs are able to adapt to the changes. There are points where the special subframe need to shift when they are close to 1 ms drift due to satellites orbiting at high speed, so that the changes match the protocol periodicity and the smooth shifts of Tx-Rx time. Must follow the 1 ms granularity for the ring sliding over the fixed cell. The Network Control Center (NCC), which is at the gate way site 154, and the NCC has a controller that guides the ring switching for each Base Band Unit (BBU) of the gNodeB 156, as well as handling communications at the satellites 20a, 20b for each cell 7 (e.g., the operating parameters for the Tx/Rx beams of the cell 7). Each gNodeB 156 can have a plurality of BBUs, each of which has a controller that controls a single cell 7.

Figure 6:
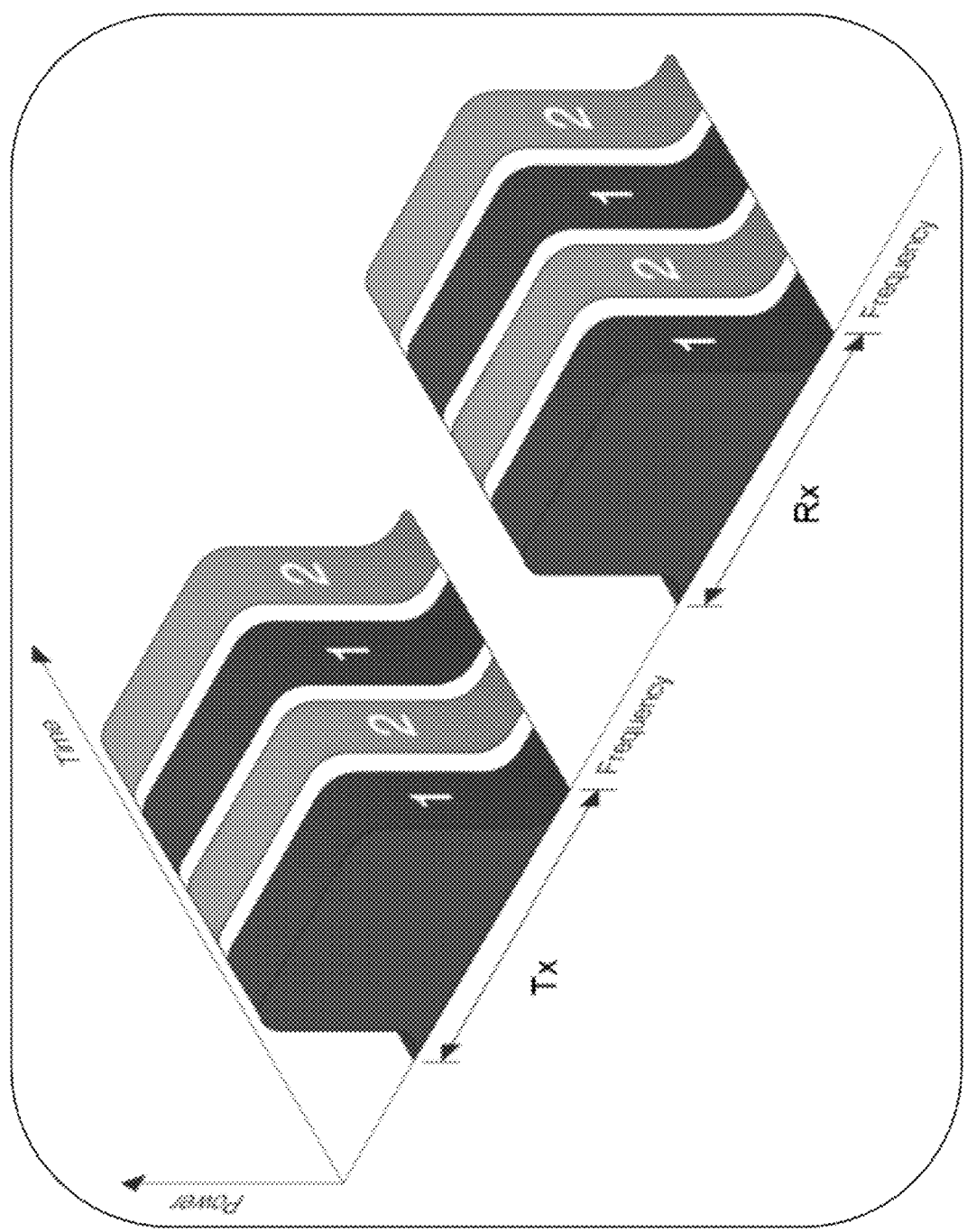
FIG. 6 is a diagram showing the Tx/Rx frequency split.

The solution for better use of the TDD spectrum resources by having different DL/UL ratio (the respective number of DL and UL subframe) would be a new use of TDD bandwidth part (BWP) in smaller granularity (say 20 MHz) into multiple TDD BWPs (4×5 MHz) and do the different DL/UL ratio for each partition of BWs, so that there will be different frequency sub-band usage by all the cells to avoid phase array Rx suffer from interference of the strong Tx. Dynamic adjusting of the TDD resources according to the needs as shown in FIG. 6. Thus, within the TDD, each BWP can have a different frequency. For example, any overlap in DL and UL processing can be resolved by assigning a different frequency for the DL and UL signals.

The width of each ring 5 can be smaller with HB (high band, i.e., approximately 2 GHz), as the cell size reduces, hence ring changing would be quicker than LB (low band, approximately 1 GHz), but a few seconds for a ring change is not too much for a gNodeB. Scheduling is parameterized with any ring.

One objective of the above description is to be able to run the TDD with a modified gNodeB but minimizing additional changes. Running an engine that can recover the frequency dimension lost when working on TDD instead of FDD. The DTDD controller 160 provides a dynamic and real-time assignment of the frequencies depending on the position on the ring 5 and makes the operation transparent to the gNodeB 156 and the UE 10.

It cross-correlates and assigns in real-time the frequency plan, with each carrier assigned to either to Tx or Rx; there is a scheduler that determines the best means of transmitting each carrier in real time, using carrier planning that continuously adjusting itself in real time. Each carrier is assigned just for Tx or Rx and they're assigned in different ring levels to minimize the delay difference impact.

Turning to FIG. 4(a), a timing diagram is shown to illustrate an issue with TDD when used for a single satellite having ten frames 0-9. A downlink signal is transmitted from the satellite 20 to the UE 10, which is transmitted from the satellite 20 during a satellite downlink frame DL-SAT and received at the UE during a UE downlink frame DL-EU. The downlink signal starts at a first time period T=0, but due to the pathlength from the satellite 20 to the UE 10, there is a delay until the downlink signal is first received at the UE, at T=1. In addition, an uplink signal is transmitted from the UE to the satellite, which is transmitted from the UE during a UE uplink frame UL-EU and received at the satellite during a satellite uplink frame UL-SAT.

That delay in transmission between the satellite and the UE causes an overlap in operation when the satellite 20 changes from transmitting data to the UEs 10 in the downlink frames, to receiving data from the UEs 10 in the uplink frames, as shown where the DL-UE and UL-UE overlap at T=5 to T=8. For example, the satellite 20 continues to transmit the downlink signal until time T=6, and from T=7 to T=10 the satellite 20 receives uplink data. In addition, at time T=5, the UE must begin to transmit data to the satellite 20 in order for that data to be received at the beginning of the uplink frames at T=7 to make full use of the satellite and maximize satellite operations. Consequently, any transmission from the satellite to the UE after a certain time, say T=6, will be received at the UE when the UE is in the transmission mode, at T=8. More specifically, the UE will both be receiving data from the satellite and also transmitting data to the satellite from T=5 to T=8. That period of overlapping operation cannot be reliably performed by the UE and is likely to have errors and interference.

In FIG. 4(b) it is shown that the greater the distance in the FOV between the satellite and the UE, the greater the pathlength, and the longer the delay in the UL and DL transmissions, which can be further based on orbital position, FOV and other factors. Where the delay is long enough, it can resolve the overlapping operation at the UE; as shown, there is no overlap between the DL-UE frame and the UL-UE frame. However, a longer delay causes an overlapping operation at the satellite 20 when the satellite converts from downlink during the DL-SAT frames to uplink during the UL-SAT frames, which also is undesirable. Accordingly, a delay is needed that avoids overlapping operations at both the UE and the satellite.

Figure 5A:
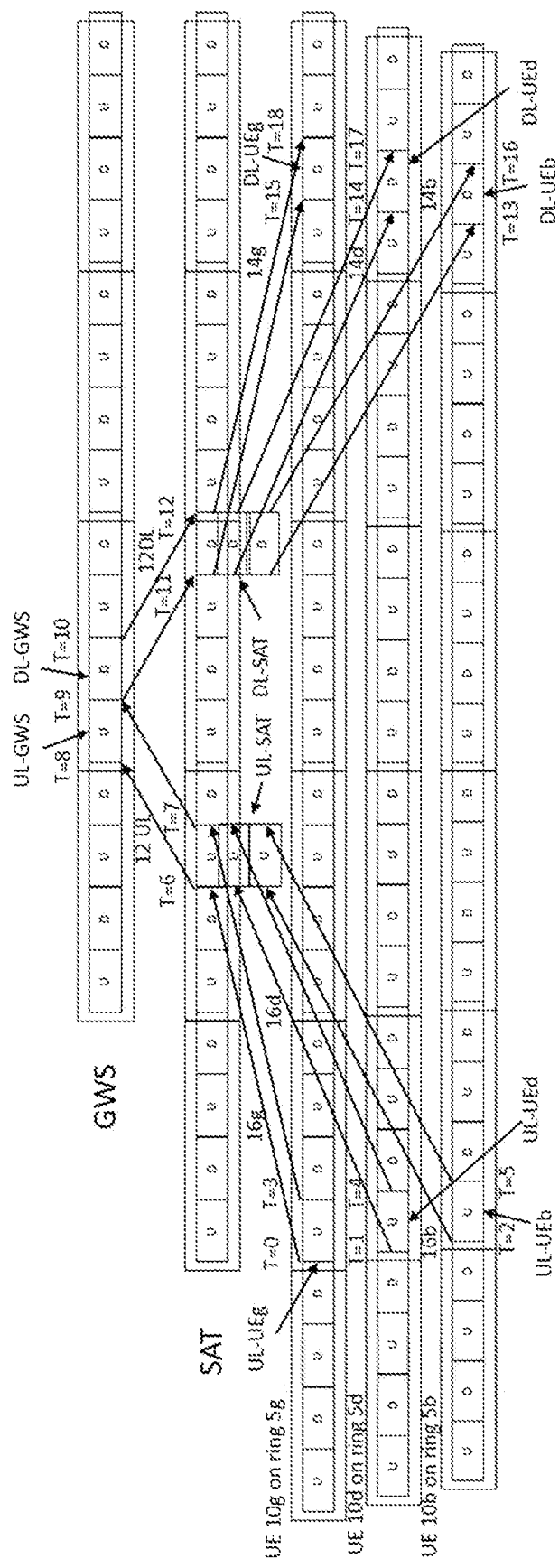
FIG. 5(a) is a timing diagram for a GateWay Station (GWS), a single satellite (SAT) and UEs located in rings of FIG. 3.

FIG. 5(a) shows a timing diagram for a single satellite operation (FIG. 2(a)) to maximize capacity at the satellite 20, and FIG. 5(a) shows a timing diagram for two satellite operation (FIG. 2(b)) to maximize capacity at the satellites 20a, 20b. Referring first to FIG. 5(a), the figure shows an example where UEs 10b, 10d, 10g are active in three of the rings, namely rings 5b, 5d and 5g, respectively. As shown, the UEs 10*b*, 10*d*, 10*g* transmit respective signals on respective distinctive beams 16*b*, 16*d*, 16*g* during respective uplink time frames UL-UEb, UL-UEd, UL-UEg to the satellite 20 to be processed at the satellite 20 during an uplink frame UL-SAT from T=6 to T=7. For the uplink beams 16*b*, 16*d*, 16*g* to be received at the same time T=6, the UE 10*g* in the furthest ring 5*g* must begin transmitting at the earliest time T=0 to T=3, time frame UL-UEg, since that UE transmission has the longest pathlength and the longest delay. The UE 10*d* in the next furthest ring 5*d* in the example must begin transmitting at the next earliest time T=1 to T=4, time frame UL-UEd. And the UE 10*b* in the closest ring 5*b* begins transmitting at the latest time T=2 to T=5, time frame UL-UEb. Accordingly, the beams from each of the rings 5*g*, 5*d*, 5*b* arrive simultaneously at the satellite time slot UL-SAT at T=6 to T=7.

The satellite 20, also during the satellite uplink time frame UL-SAT, transmits the uplink signals 12 UL to the gate way site 154 and after a delay is received at T=8 to T=9 during an uplink time slot at the gate way site UL-GWS. At the next downlink time slot at the gate way site DL-GWS, at time T=9 to T=10, the gate way site 154 transmits a downlink signal 12DL to the satellite 20. It is received at the satellite during a satellite downlink time slot DL-SAT from T=11 to T=12. Thus, the UL subframe for the UEs in different rings are offset with respect to one another so that the UL signals are synchronized when received at the satellite.

At that same time, the satellite simultaneously transmits that downlink signal on respective distinctive downlink beams 14*b*, 14*d*, 14*g*, all starting at the same time T=11 and ending at the same time T=12. The closest UEs 10*b* (i.e., the UEs in ring 5*b*, FIG. 3) receives the downlink signal 14*b* first, at DL-UEb, because it has the least delay in communication with the satellite based on its pathlength and other factors. The next closest UE 10*d* (i.e., the UEs in ring 5*d*, FIG. 3) receives the signal 14*d* next, at DL-UEd, and the furthest UE 10*g* (i.e., the UEs in ring 5*g*, FIG. 3) receives the downlink signal 14*g* last, at DL-UEg. Thus, the DTDD controller 160 provides different delays for the UEs located in the various rings 5*a*-5*g* of FIG. 3, to avoid overlapping UL and DL frames at the GWS 154, the satellite 20, and/or the UEs 10. That is, the UEs 10 located in the closest ring 5*a* will all be associated with a first delay, the UEs 10 located in the next closest ring 5*b* will all be associated with a second delay longer than the first delay, and the UEs located in the furthest ring 5*g* will all be associated with a seventh delay longer than the first-sixth delays for rings 5*a*-5*f*. Thus, the DL signal is synchronized at the satellite 20.

Accordingly, UE uplink frames for the three UEs, namely uplink frames UL-UEb, UL-UEd, UL-UEg, are offset with respect to one another, and can overlap (or not) with one another. However, the UE closest to the satellite, UEb, has an uplink frame UL-UEb that starts and ends last at T=2 to T=5 and a downlink frame DL-UEb that starts and ends first, at T=13 to T=16; the next closest UEd has an uplink frame UL-UEd that starts and ends after the closest UEb starts and ends, at T=1 to T=4, and a downlink frame DL-UEd that starts and ends after the closest UEb starts and ends, at T=14 to T=18; and the furthest UEg has an uplink frame UL-UEg that starts and ends last (after UL-UEb and UL-UEd start and end), at T=15 to T=18. The UE frames can be stretched to accommodate that timing. However, for a single satellite (FIG. 2(*a*)), the TDD Tx signals may interfere with the Rx signals.

As further illustrated in FIG. 5(*a*), there is no overlapping operation at any of the gate way site 154, the satellite 20 or the UEs 10. That is, none of those elements need to receive and transmit at the same time. And, communications occur without collision between transmit and receive for all UEs 10 in all cells 7. And, the satellite uplink can start and end at the same time, T=6 to T=7; and the satellite downlink can start and end at the same time, T=11 to T=12. That entire operation is coordinated by the DTDD controller 160.

Though FIG. 5(*a*) is illustrated for a single satellite (FIG. 2(*a*)) for a particular case to avoid Tx Rx collision, such case is with constraints of cell position, U/D periods matching the delay, it is clear that the next frame will run into collision. So, with one satellite TDD is challenging. However, the solution does exist when the full constellation of satellites are available, as in that case each cell can see normally 4 satellites. Hence a better TDD solution can be formed from two satellites (FIG. 2(*b*)), one does the Tx only while the other does the Rx, as shown for example in FIG. 5(*b*). The 3D diagram (FIG. 2(*b*)) illustrates spatial, time and frequency diversity to avoid the interference from Tx of 2 or 2+ satellites. The 2+ satellites handling TDD case would be the preferred one as there is no restrictions on the DL and UL fractions, and can fit in the demand better.

Referring to FIG. 5(*b*), a timing diagram is shown where there are two satellites (FIG. 2(*b*)), where a first satellite (SAT1) 20(*a*) only conducts uplink (U), and a second satellite (SAT2) 20(*b*) only conducts downlink (D), for a given UE or cell or FOV. Thus, starting at a first time period, T=0 to T=1, all of the UEs from all of the rings 5*b*, 5*d*, 5*g* transmit an uplink signal 16 during its uplink frame, UL-UEb, UL-UEd, UL-UEg. Because the UEs are in different rings and at different distances from the second satellite 20(*b*), those signals arrive at the second satellite 20(*b*) at different times. Namely, the uplink signal from the closest UEb, UL-UEb arrives at a frame that starts and ends first, at times T=2 to T=4; the uplink signal from the next closest UEd, UL-UEd arrives at a frame that starts and ends after the first signal UL-UEb, at times T=3 to T=6; and the furthest UEg, UL-UEg arrives at a frame that starts and ends after the first and second signals, UL-UEb and UL-UEb, at times T=5 to T=7.

The second satellite 20(*b*) operates as a pass through and sends those offset signals to the gate way site 154. The DTDD 160 applies a respective delay to each signal. The signal 16*b* from frame UL-UEb arrived first, so the DTDD applies the longest delay, Delay b. The second signal 16*d* to arrive is from UL-UEd, and the DTDD 160 gives that a Delay d, which is shorter than the first delay, Delay b. And the last signal 16*g* to arrive is from frame UL-UEg, which receives the shortest delay, Delay g. The delays b, d, g are configured so that all of the uplink signals are recognized at the DTDD 160 at a same time, starting at T=8 and ending at time T=9. Thus, although the signals 16*b*, 16*d*, 16*g* arrived at the second satellite 20(*b*) at different times, they are all synchronized at the gate way 154, for example at the DTDD 160. It is noted that although all the uplink signals 16*b*, 16*d*, 16*g* are shown being sent at the same time (T=0 to T=1 in the example embodiment shown) from the UEs 10*b*, 10*d*, 10*g*, they can be sent at different times and an appropriate delay can be applied to each respective signal by the DTDD 160. However, in some embodiments, the uplink signals from the UEs are all on the same band, and can be the same or different frequencies. The downlink signals 14*b*, 14*d*, 14*g* can be treated in a similar manner, with a delay being applied at the gate way such as by the DTDD 160, so that the downlink signals are sent at different times (though shown in the figure at the same time), so they arrive at the UEs at a same time period.

One goal in FIGS. 2(a), 2(b), 5(a), 5(b) is to make the TRx switching on the same subframe timing that can be achieved by each eNB to configure the timeslots for downlink and uplink with and/or without frequency scheduling resources according to the needs of the active UEs. Thus, the DL and UL do not occur at the same time, same distance and same frequency.

Turning to FIG. 6, another embodiment of the disclosure is illustrated. Here, the uplink and downlink signals can be on different frequencies to eliminate interference at the GWS 154, satellite 20 and/or UE 10, either on a same beam or different beams. FIG. 6 shows the Tx/Rx frequency split: the frequency dimension and Tx/Rx separation is recovered with an external controller. This is transparent for the gNodeB, but a coordinated mapping of the radio resources: 1 and 2 here are timeslots for smaller scale FDD within a TDD system in this context. The further introduction of such FDD can avoid the interference between Tx and Rx, and can be very dynamic. In time collision case in a TDD case, using different sub carriers for Tx and Rx can help avoid interference.

The DTDD system 100 addresses two issues. First, Satcom RF path length delay is much longer than the TDD DL and UL cycle (10 ms in general). Unlike FDD, where there is an extra dimension of frequency to make the Tx and Rx independent of each other, and full duplex works gracefully without restriction to each other. The DTDD provides that extra dimension back to the TDD link in a transparent way for the cellular system (gNodeB to UE connection).

Second, RF path length differences to the cells in the satellite FoV would mean that the delay normalisation would make satellite beams TRx not aligned between all the cells 7 in the FoV, and that would cause some cells that are transmitting Tx to interfere with the cells that are receiving Rx. With the addition of the concept of rings (FIG. 3) the synchronization is done in each of them, so the latency to the satellite is similar for all the UEs in each ring.

In addition to the above solution, with full constellation, a cell would be covered by more than one beam from different satellites, the overlapping FOV can have the advantage of solving the above TDD Tx/Rx collision on one satellite. The multiple satellites can do independent Tx/Rx for each other and avoid collision 100% if coordinated well. There is no restriction with regards to the Tx and Rx switching time, as there is only Tx or Rx for that band. The gNodeB needs to configure the scheduler and keep the same ratio of D/U on all the cells the satellite 20 is serving. The gNodeB and/or DTDD controller 160 can handle Doppler compensation for the UEs.

It is implemented at the gateway, outside the gNodeB. The flow chart should have a transmission from gNodeB in frequency A, then a frequency conversion to get to the satellite in V band, then another frequency conversion to transmit in frequency B, within the same band but with an offset. Then the UE will transmit back in frequency A, this will be converted also to V band, and sent back to the gNodeB in frequency A.

It is noted that the FOV is divided into concentric rings or circles. However, any suitable separation can be provided.

In the embodiments disclosed, the DTDD controller 160 (as well as the BBU controller and the NCC controller) can include a processing device to perform various functions and operations in accordance with the disclosure, though operation can alternatively be performed at the gNodeB 156 and/or the satellite 20. The processing device can be, for instance, a computer, personal computer (PC), server or mainframe computer, or more generally a computing device, processor, application specific integrated circuits (ASIC), or controller. The processing device can be provided with one or more of a wide variety of components or subsystems including, for example, wired or wireless communication links, input devices (such as touch screen, keyboard, mouse) for user control or input, monitors for displaying information to the user, and/or storage device(s) such as memory, RAM, ROM, DVD, CD-ROM, analog or digital memory, flash drive, database, computer-readable media, floppy drives/disks, and/or hard drive/disks. All or parts of the system, processes, and/or data utilized in the system of the disclosure can be stored on or read from the storage device(s). The storage device(s) can have stored thereon machine executable instructions for performing the processes of the disclosure. The processing device can execute software that can be stored on the storage device. Unless indicated otherwise, the process is preferably implemented in automatically by the processor substantially in real time without delay. In some embodiments, the system 100 of the present disclosure is configured to operate and communicate with standard UEs 10. That is, the UE can be a standard UE without any special electronic components or operating software. In addition, the entire process is conducted automatically by the processor, and without any manual interaction. Accordingly, unless indicated otherwise the process can occur substantially in real-time without any delay or manual action.

The description and drawings of the present disclosure provided in the paper should be considered as illustrative only of the principles of the disclosure. The disclosure may be configured in a variety of ways and is not intended to be limited by the preferred embodiment. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A satellite communication system, comprising:
   a first satellite configured for operative communication with a gateway device via a first feeder link and for direct communication with one or more user equipment (UE) over respective uplink signals and downlink signals, the first satellite having a first field of view (FOV) encompassing a first plurality of cells; and
   a second satellite configured for operative communication with the gateway device via a second feeder link and for direct communication with one or more UE over respective uplink signals and downlink signals, the second satellite having a second FOV encompassing a second plurality of cells, a selected one of the second plurality of cells corresponding to a selected one of the first plurality of cells;
   wherein:
      the first satellite is configured to receive, according to timing information received from the gateway device via the first feeder link, an uplink signal during a first time slot to a given one of the one or more UE located in the selected one of the first plurality of cells that corresponds to the selected one of the second plurality of cells; and
      the second satellite is configured to transmit, according to timing information received from the gateway device via the second feeder link, a downlink signal to the given UE during a second time slot that does not overlap with the first time slot.

2. The satellite communication system of claim 1, wherein:
the first satellite is configured to receive the uplink signal over a first frequency; and
the second satellite is configured to transmit the downlink signal over a second frequency that does not overlap with the first frequency.

3. The satellite communication system of claim 1, wherein:
the first satellite is selected to only receive uplink signals from the given UE within the selected cell; and
the second satellite is selected to only transmit downlink signals to the given UE within the selected cell.

4. The satellite communication system of claim 1, wherein the first satellite and the second satellite are positioned to provide spatial diversity with the selected cell, and the first satellite and the second satellite communicate with the given UE within the selected cell according to time diversity and frequency diversity.

5. The satellite communication system of claim 1, wherein:
the first satellite is selected to only conduct uplink communication with the selected cell; and
the second satellite is selected to only conduct downlink communication with the selected cell.

6. The satellite communication system of claim 1, wherein:
the first satellite is selected to only conduct uplink communication within the first FOV; and
the second satellite is selected to only conduct downlink communication within the second FOV.

7. The satellite communication system of claim 1, further comprising the gateway device.

8. The satellite communication system of claim 7, wherein the gateway device includes a dynamic time division duplex (DTDD) controller configured to establish communication timeslots for use by the first and second satellites during communication with the given UE.

9. The satellite communication system of claim 8, wherein the timeslots are selected to have corresponding delays to avoid overlap between the uplink signal and the downlink signal.

10. The satellite communication system of claim 8, wherein the DTDD controller is configured to determine a routing arrangement of the first and second feeder links.

11. The satellite communication system of claim 10, wherein the DTDD controller is further configured to determine at least one of direct digital control parameter or a mapping for satellite handover between the first satellite and the second satellite.

12. The satellite communication system of claim 7, wherein the gateway device is configured to segregate the at least one of the first FOV or the second FOV into a plurality of concentric rings, each of the plurality of concentric rings having a corresponding delay for use with one or both of the uplink signal and the downlink signal.

13. The satellite communication system of claim 12, wherein:
each concentric ring associated with the first satellite corresponds to a different pathlength from the first satellite to the Earth; and
each concentric ring associated with the second satellite corresponds to a different pathlength from the second satellite to the Earth.

14. A satellite communication system configured for communication with a satellite having a field of view (FOV), in which the satellite is configured to directly communicate with user equipment (UE) over uplink signals and downlink signals, the satellite communication system comprising:
a controller having one or more processors configured to:
segregate the FOV of the satellite into a plurality of concentric rings, each of the plurality of concentric rings being associated with a respective delay;
establish a first UE uplink time slot having a first delay for a first one of the plurality of concentric rings, for transmission by a first UE located within the first concentric ring; and
establish a second UE uplink time slot having a second delay for a second one of the plurality of concentric rings, for transmission by a second UE within the second concentric ring;
wherein the first and second delays are established to avoid overlapping transmission between the first UE and the second UE.

15. The satellite communication system of claim 14, wherein each concentric ring corresponds to different a pathlength from the satellite to the Earth.

16. The satellite communication system of claim 14, wherein an outermost one of the plurality of concentric rings defines an outer perimeter of the FOV of the satellite.

17. The satellite communication system of claim 14, wherein the plurality of concentric rings follows the satellite as it orbits the Earth.

18. The satellite communication system of claim 14, wherein a given one of the plurality of rings encompasses a plurality of cells within the FOV.

19. The satellite communication system of claim 14, wherein the controller is configured to adjust placement of at least one of a downlink pilot time slot or an uplink pilot time slot within different communication subframes.

20. The satellite communication system of claim 19, wherein the adjustment is based on an orbiting speed of the satellite.

21. The satellite communication system of claim 14, wherein the satellite comprises a pair of satellites, and the controller is further configured to cause each one of the pair of satellites to communicate directly with the UE over distinct, nonoverlapping frequencies.

* * * * *